United States Patent
Ozeki

[11] Patent Number: 5,924,332
[45] Date of Patent: Jul. 20, 1999

[54] DAMPER DOOR CONTROLLER FOR AUTOMOTIVE AIR CONDITIONER

[75] Inventor: Yukio Ozeki, Tochigi, Japan

[73] Assignees: Calsonic Corporation; Honda Giken Kogyo Kabushiki Kaisha, both of Tokyo, Japan

[21] Appl. No.: 08/925,730

[22] Filed: Sep. 9, 1997

[30] Foreign Application Priority Data

Sep. 18, 1996 [JP] Japan ................................. 8-246572

[51] Int. Cl.⁶ ................................. F16C 1/10; F24F 7/00
[52] U.S. Cl. ................. 74/502.4; 74/500.5; 74/501.5 R; 74/502.6; 74/553; 454/316
[58] Field of Search .................. 74/500.5 R, 504, 74/553; 454/316, 121, 313

[56] References Cited

U.S. PATENT DOCUMENTS

| | | | |
|---|---|---|---|
| 4,409,861 | 10/1983 | Sakurai | 74/501 R |
| 4,561,565 | 12/1985 | Wolf et al. | 74/553 X |
| 4,653,386 | 3/1987 | Hayakawa et al. | 454/316 |
| 5,245,886 | 9/1993 | Truesdell et al. | 74/501.6 |

FOREIGN PATENT DOCUMENTS 1-175410  12/1989  Japan .
2-104415   8/1990  Japan .

Primary Examiner—Vinh T. Luong
Attorney, Agent, or Firm—Foley & Lardner

[57] ABSTRACT

A damper door controller is provided for remotely controlling damper doors of a cooler/heater unit of an automotive air conditioner. The controller comprises a knob holder; at least one rotary knob rotatably connected to the knob holder; a pinion coaxially connected to the rotary knob to rotate therewith; an elongate guide slot formed in the knob holder; a rack member slidably received in the guide slot, the rack member being operatively meshed with the pinion; a cable assembly including a control cable and a sleeve in which the control cable slides, the control cable having a leading end fixed to a leading end of the rack member; and a clamp member provided by the knob holder and extending across a generally middle portion of the guide slot to clamp a leading end of the sleeve.

23 Claims, 3 Drawing Sheets

DAMPER DOOR CONTROLLER FOR AUTOMOTIVE AIR CONDITIONER

BACKGROUND OF THE INVENTION

1. Field of the Invention

The present invention relates in general to controllers for an automotive air conditioner, and more particularly to damper door controllers which adjust positions of various damper doors installed in a cooler/heater unit of the automotive air conditioner.

2. Description of the Prior Art

Usually, various damper doors are installed in a cooler/heater unit of an automotive air conditioner for controlling the temperature of air blown into various given portions of a motor vehicle, which are, for example, an upper portion of a passenger room, a lower portion of the passenger room, an inside space facing a windshield, etc.,. In fact, due to pivot operation of the damper doors, various modes are provided by the cooler/heater unit, which are, for example, a ventilation mode wherein conditioned air is blown to the upper portion of the passenger room, a foot mode wherein the air is blown to the lower portion of the passenger room, a bilevel mode wherein the air is blown to both the upper and lower portions of the passenger room and a defrost mode wherein the air is blown against an inside surface of the windshield to defrost the same.

Usually, the damper doors are remotely controlled through a link mechanism by a mode selection knob which is carried on a knob holder unit arranged on an instrument panel of the motor vehicle. That is, by manipulating the mode selection knob, the damper doors of the cooler/heater unit are pivoted to selected positions to provide the unit with one of the above-mentioned modes. In addition to the mode selection knob, the knob holder unit has further a temperature control knob by which an open degree of one damper door (viz., air mixing door) is controlled for adjusting the temperature of air blown to the passenger room, a fan speed control knob by which the amount of air fed to the passenger room is controlled, and an air conditioner switch by which a cooling cycle of the air conditioner is turned ON or OFF.

To transmit the movement of the mode selection knob to the damper doors through the link mechanism, a cable type movement transmitting mechanism is hitherto employed wherein a control cable extends from the mode selection knob to the link mechanism, which is shown in, for example, Japanese Utility Mode First Provisional Publication 1-175410 and 2-104415. In the cable type movement transmitting mechanism shown in these publications, a rotary mode selection knob is used, so that rotating movement of the mode selection knob induces movement of the control cable and the link mechanism for pivoting the damper doors to desired positions. A rack-and-pinion unit is employed for transmitting the rotating movement of the rotary mode selection knob to the control cable. That is, a pinion is coaxially connected to the rotary mode selection knob to rotate therewith and a rack member is connected to a leading end of the control cable. The control cable is slidably received in an elongate plastic sleeve which has a leading end clamped to a base plate of the knob holder unit.

However, due to its inherent construction, the cable type movement transmitting mechanism shown by the above-mentioned publications has failed to provide the users with satisfaction. That is, in the mechanism, it is inevitably necessary to have the rack member projected from the plastic sleeve by a degree corresponding to a reciprocating movement thereof induced by the rotating movement of the rotary mode selection knob. This means that for achieving a smoothed movement of the control cable in the plastic sleeve the clamped end of the plastic sleeve should be so oriented that the opening thereof faces against the direction of the way along which the rack member moves. More specifically, a certain length of an end portion of the plastic sleeve including the clamped end should extend straight along with an extension of the way along which the rack member moves. However, such straight extension of the sleeve causes a too long construction of the movement transmitting mechanism. Furthermore, such straight extension induces a need of providing the sleeve with a sharply curved portion particularly when the transmitting mechanism is installed in a limited space of a motor vehicle. As is easily known, presence of such sharply curved portion on the sleeve increases the sliding friction of the control cable in the sleeve, which obstructs a smoothed movement transmission from the rotary mode selection knob to the damper doors.

SUMMARY OF THE INVENTION

It is therefore an object of the present invention to provide a damper door controller for an automotive air conditioner, which is free of the above-mentioned drawbacks.

According to the present invention, there is provided a damper door controller for remotely controlling damper doors of a cooler/heater unit of an automotive air conditioner, which is reliable in operation and compact in size.

According to the present invention, there is provided a damper door controller for remotely controlling damper doors of a cooler/heater unit of an automotive air conditioner, which comprises a knob holder; at least one rotary knob rotatably connected to the knob holder; a pinion coaxially connected to the rotary knob to rotate therewith; an elongate guide slot formed in the knob holder; a rack member slidably received in the guide slot, the rack member being operatively meshed with the pinion; a cable assembly including a control cable and a sleeve in which the control cable slides, the control cable having a front end fixed to a front end of the rack member; and a clamp member provided by the knob holder and extending across a generally middle portion of the guide slot to clamp a front end of the sleeve.

According to the present invention, there is further provided a cable type movement transmitting mechanism which comprises a knob holder; a rotary knob rotatably connected to the knob holder; a pinion coaxially connected to the rotary knob to rotate therewith; an elongate guide slot formed in the knob holder; a rack member slidably received in the guide slot, the rack member being operatively meshed with the pinion; a cable assembly including a control cable and a sleeve in which the control cable slides, the control cable having a leading end fixed to a leading end of the rack member; and a clamp member provided by the knob holder and extending across a middle portion of the guide slot to clamp a leading end of the sleeve.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
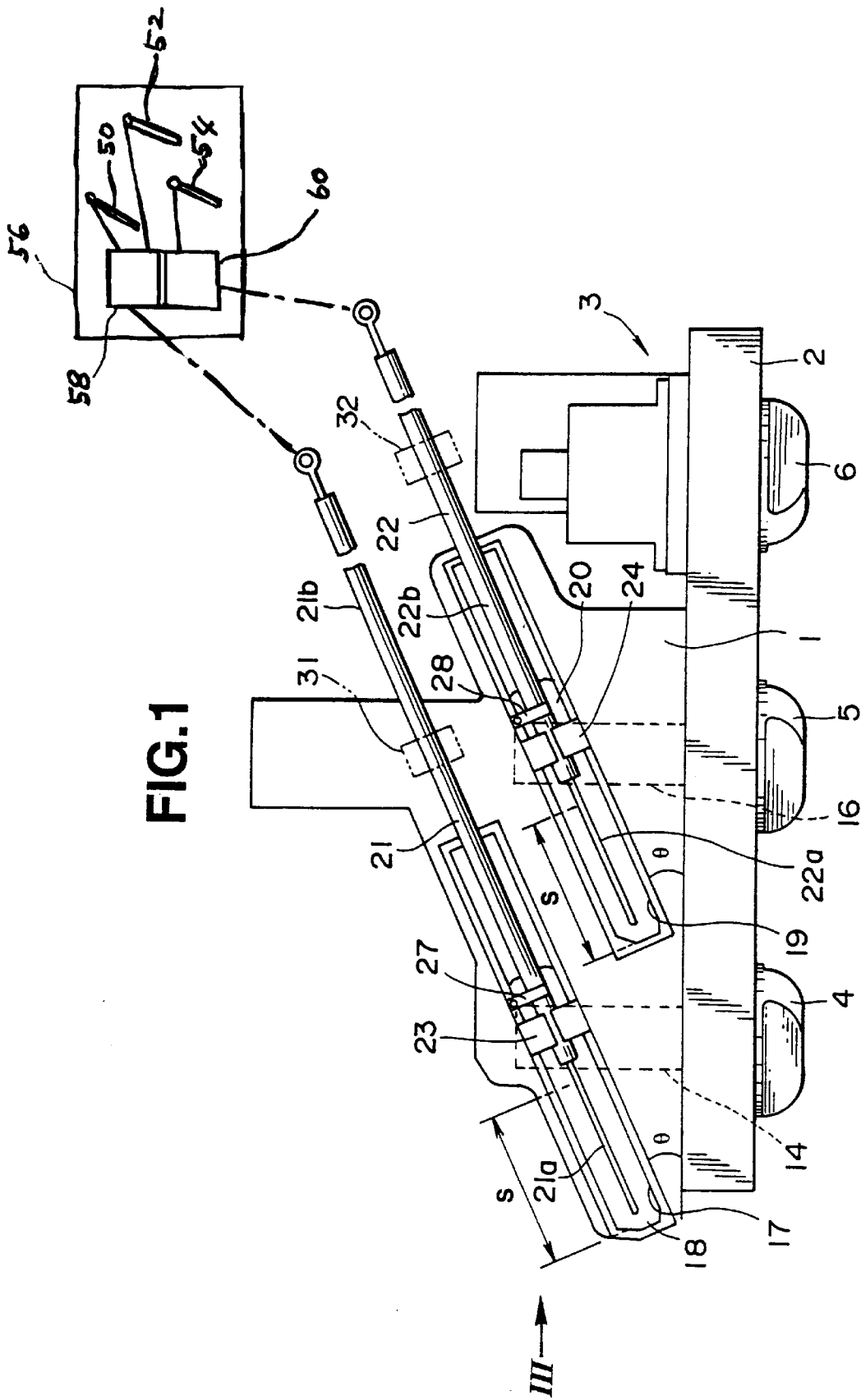
FIG. 1 is a plan view of a damper door controller for an automotive air conditioner, which embodies the present invention.

Referring to the drawings, particularly FIG. 1, there is shown a damper door controller for an automotive air conditioner, which is an embodiment of the present invention.

Figure 3:
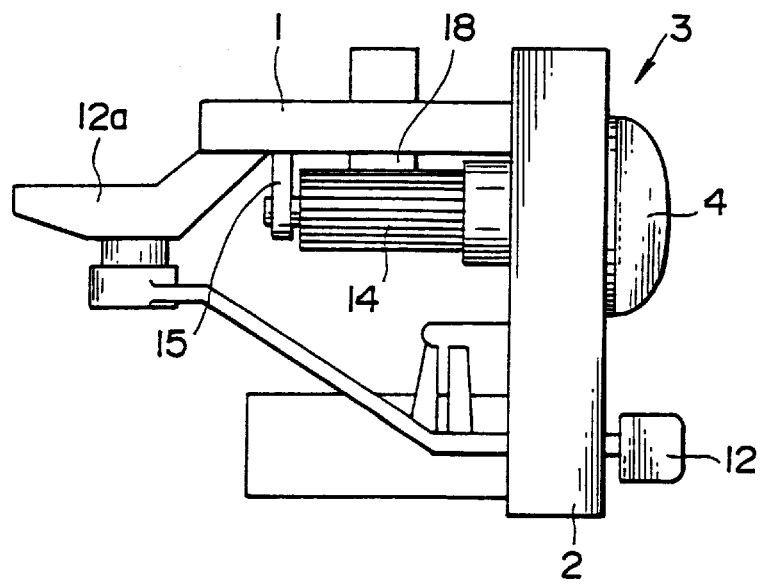
FIG. 3 is a side view taken from a direction of the arrow "III" of FIG. 1.

The damper door controller comprises a knob holder 3 including a base plate 1 and a finisher plate 2 which extends perpendicularly downward from a front end of the base plate 1 (see FIG. 3). The knob holder 3 is constructed of a molded plastic. When assembled in an instrument panel of a motor vehicle, the knob holder 3 is so oriented that an outer surface of the finisher plate 2 faces toward a passenger room of the vehicle.

The finisher plate 2 has three rotary knobs 4, 5 and 6 rotatably connected thereto, which are a mode selection knob, a temperature control knob and a fan speed control knob respectively.

Figure 2:
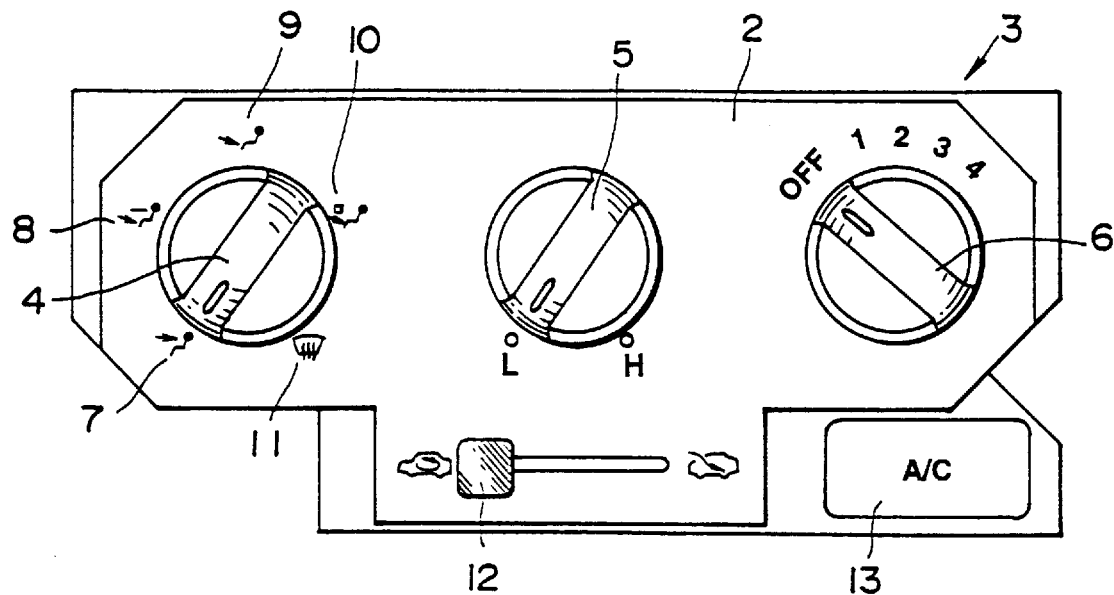
FIG. 2 is a front view of the damper door controller of the invention.

As will be understood from FIG. 2, the mode selection knob 4 has five mode setting positions 7, 8, 9, 10 and 11, which are a ventilation mode setting position 7 for permitting a conditioned air to be blown into an upper portion of the passenger room, a bilevel mode setting position 8 for permitting the conditioned air to be blown into upper and lower portions of the passenger room, a foot mode setting position 9 for permitting the conditioned air to be blown into the lower portion of the passenger room, a foot-defrost mode setting position 10 for permitting the conditioned air to be blown to the lower portion of the passenger room as well as to an inside surface of a windshield and a defrost mode setting position 11 for permitting the conditioned air to be blown against the inside surface of the windshield. That is, by rotating the mode selection knob 4 to one of the five mode setting positions 7, 8, 9, 10 and 11, some of damper doors installed in a cooler/heater unit (not shown) of the air conditioner are pivoted to certain positions to provide an air flow circuit which establishes one of the above-mentioned five modes.

The temperature control knob 5 is a controller for controlling an open degree of one of the damper doors (viz., air mixing door) to adjust the temperature of air blown to the passenger room. That is, when the temperature control knob 5 is turned counterclockwise in FIG. 2 to assume an illustrated leftmost position "L", lowest temperature air is blown into the passenger room, and when the temperature control knob 5 is turned clockwise to assume a rightmost position "H", highest temperature air is blown into the passenger room. When the control knob 5 is turned to any position between the leftmost and rightmost positions "L" and "H", air having a desired temperature is blown into the passenger room.

The fan speed control knob 6 is a controller for controlling a rotation speed of a fan by which conditioned air is blown into the passenger room. In the illustrated example, the fan speed control knob 6 has an OFF position and four speed positions "1", "2", "3" and "4".

As is best shown in FIG. 2, the finisher plate 2 has further a control lever 12 which is moved between an open position to permit induction of outside air into the passenger room and an illustrated closed position to permit circulation of inside air in the motor vehicle through the passenger room. For this air flow control, one of the damper doors is used, which is controlled by the control lever 12. That is, as is understood from FIG. 3, a pivotal rear end 12a of the control lever 12 has a lever to which a control cable (not shown) extending from the damper door is connected.

Referring back to FIG. 2, the finisher plate 2 has further an air conditioner switch 13 by which a cooling cycle of the air conditioner is turned ON or OFF. In the illustrated example, the switch 13 is of a push button type.

As is seen from FIG. 3, below the base plate 1 of the knob holder 3, there is arranged a pinion 14 which is coaxially connected at one end thereof to a shank portion of the mode selection knob 4. The other end of the pinion 14 is rotatably held by a bracket 15 which extends downward from the base plate 1. Thus, the mode selection knob 4 and the pinion 14 rotate together like a single unit. Similar to the case of the mode selection knob 4, below the base plate 1, there is arranged another pinion 16 (see FIG. 1) which is coaxially connected at one end thereof to a shank portion of the temperature control knob 5. The other end of the pinion 16 is rotatably held by a bracket (not shown) extending from the base plate 1. Thus, the temperature control knob and the pinion 16 rotate together like a single unit.

Figure 4:
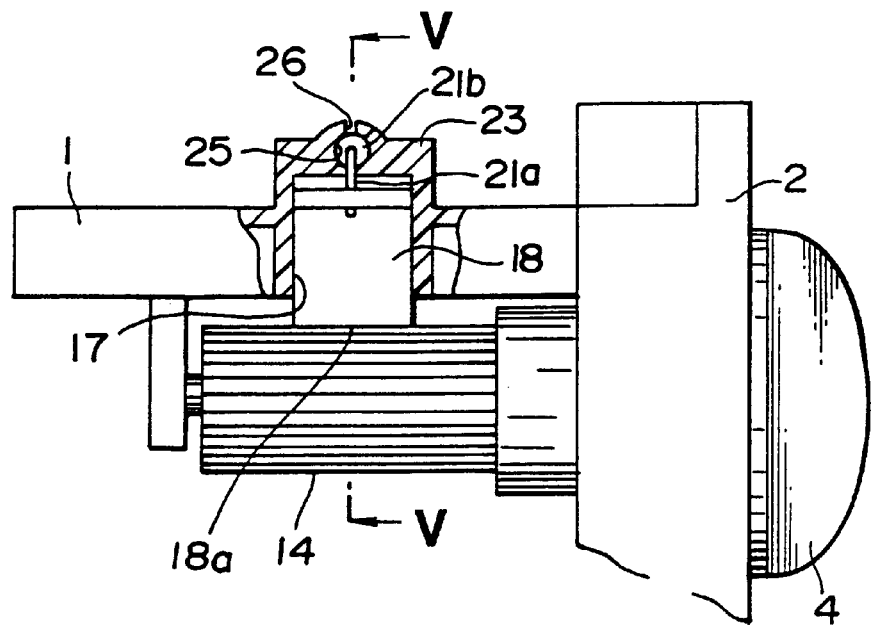
FIG. 4 is an enlarged view of FIG. 3 with some portions cut out.
Figure 5:
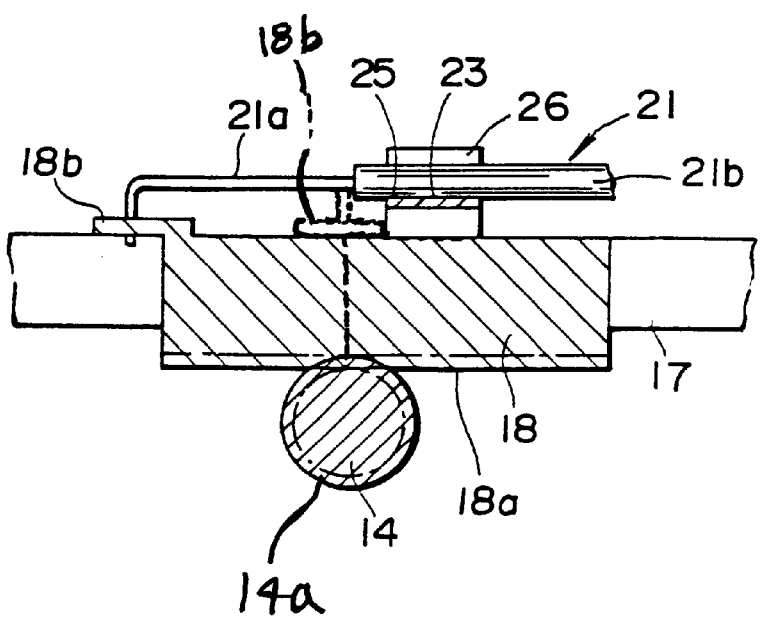
FIG. 5 is a sectional view taken along the line "V—V" of FIG. 4.

As seen from FIGS. 1, 4 and 5, the base plate 1 of the knob holder 3 is formed with an elongate guide slot 17 which extends obliquely with respect to the finisher plate 2. A rack member 18 is slidably received in the guide slot 17 in such a manner that bevel teeth 18a of the rack member 18 are meshed with the teeth of the pinion 14 which is connected to the mode selection knob 4. The base plate 1 is formed with another elongate guide slot 19 (see FIG. 1) which extends obliquely. Another rack member 20 is slidably received in the guide slot 19 in such a manner that bevel teeth of the rack member 20 are meshed with the teeth of the pinion 16 which is connected to the temperature control knob 5. In the illustrated embodiment, the two guide slots 17 and 19 extend in parallel with each other.

Each guide slot 17 or 19 has a length sufficient for achieving an operative movement of the rack member 18 or 20 therein. As is easily understood from FIG. 1, the oblique arrangement of the guide slots 17 and 19 reduces the depth of the knob holder 3, that is, the length of the base plate 1. The inclination angle of the guide slot 17 or 19 relative to the finisher plate 2 is denoted by "θ" in the drawing.

For transmitting movement of the rack member 18 to a link mechanism (not shown) of the damper doors for the mode selection, a cable assembly 21 is used, and for transmitting movement of the other rack member 20 to a link mechanism (not shown) of the air mixing door for the air temperature control, another cable assembly 22 is used. Each cable assembly 21 or 22 comprises a control cable 21a or 22a and an elongate plastic sleeve 21b or 22b in which the control cable 21a or 22a slides. Each control cable 21a or 22a has a first end projected from one end of the sleeve 21b or 22b and fixed to a leading end of the rack member 18 or 20 (see FIG. 5) and a second end projected from the other end of the sleeve 21b or 22b and connected to the link mechanism.

As is understood from FIG. 5, the first end of the control cable 21a is fixed to a projection 18b integrally formed on the leading end of the rack member 18. Similar to this, the first end of the other control cable 22a is fixed to a projection of the other rack member 20.

As is seen from FIG. 1, the base plate 1 is integrally formed with both a first clamp member 23 which extends across a middle portion of the guide slot 17 and a second clamp member 24 which extends across a middle portion of the other guide slot 19. If desired, these clamp members 23 and 24 may be separate members which are secured to the base plate 1 through bolts or the like.

As will be understood from FIGS. 4 and 5, each clamp member 23 or 24 is formed with a clamping groove 25 whose upper portion 26 is reduced in thickness.

As is seen from FIGS. 1, 4 and 5, one end of the plastic sleeve 21b of the cable assembly 21 is pressed into the clamping groove 25 through the reduced portion 26 to be clamped by the clamp member 23. Similar to this, one end of the plastic sleeve 22b of the other cable assembly 22 is clamped by the other clamp member 24.

As is seen from FIG. 1, near the respective clamp members 23 and 24, the sleeves 21b and 22b of the two cable assemblies 21 and 22 are tightly held by respective holders 27 and 28 which are secured to the base plate 1.

As is seen from FIG. 1, each clamp member 23 or 24 is so positioned as to permit a full stroke "S" of the rack member 18 or 20 in the guide slot 17 or 19. That is, the clamp member 23 or 24 is so positioned as not to contact the leading end of the control cable 21a or 22a even when the rack member 23 or 24 assumes its rightmost position in FIG. 1.

When, due to manipulation of the mode selection knob 4, the pinion 14 is turned about its axis in a certain direction, the rack member 18 is forced to move in the guide slot 17 moving the control cable 21a in a corresponding direction. With this, the link mechanism connected to the control cable 21a is actuated to pivot the damper doors to corresponding positions to establish one of the above-mentioned five modes. That is, due to the manipulation of the mode selection knob 4, the rack member 18 moves between a first position, where as illustrated by a solid line, the front end of the control cable 21a is largely projected from the leading end of the sleeve 21b and a second position, where as illustrated by a dotted line, the front end of the control cable 21a is in contact with the front end of the sleeve 21b. Similar to this, manipulation of the temperature control knob 5 induces pivoting of the air mixing door to adjust the temperature of air blown to the passenger room.

In the following, advantages of the present invention will be described. For facilitation, the following description on the damper door controller will be directed to only the movement transmitting mechanism applied to the mode selection knob 4.

First, the clamp member 23 to which an end (viz., first end) of the sleeve 21b is positioned at a generally middle portion of the guide slot 17 for the rack member 18. This means that the end of the sleeve 21b is placed near the leftmost end of the guide slot 17, which allows easiness with which the control cable 21 is operatively installed in a limited space of the motor vehicle. That is, by a degree by which the end of the sleeve 21b nears the leftmost end of the guide slot 17, a radius of curvature needed by the sleeve 21b can be increased, which reduces the sliding friction of the control cable 21a in the sleeve 21b and thus smoothes the rotation of the mode selection knob 4. If the first end of the sleeve 21b is clamped at a position indicated by numeral 31 (or 32) like in the case of the above-mentioned conventional movement transmitting mechanism, a curved portion needed by the sleeve 21b is forced to have a smaller radius of curvature causing the increased sliding friction of the control cable 21a in the sleeve 21b.

Second, the guide slot 17 extends obliquely with respect to the finisher plate 2. This oblique arrangement of the guide slot 17 reduces the depth of the knob holder 3, that is, the length of the base plate 1. With this, the damper door controller can have a compact construction.

If desired, the damper door controller of the invention may be applied to the movement transmitting mechanism of the control lever 12 (see FIG. 3). That is, in this case, a pinion is fixed to the pivotal rear end 12a to rotate therewith.

The invention is practically applied also to a mechanism which uses a control cable for controlling a water control valve installed in a water inlet pipe through which an engine cooling water is led to a heater unit.

Although a specific embodiment of this invention has been shown and described, it will be understood that various modifications may be made without departing from the spirit of this invention. Accordingly, the subject invention is only to the limited by the scope of claims and their equivalents.

What is claimed is:

1. A damper door controller for controlling damper doors of a cooler/heater unit of an automotive air conditioner, comprising:

a first holder having a clamp member;

at least one rotary knob rotatably connected to said first holder;

a pinion coaxially connected to said rotary knob to rotate therewith;

an elongate guide slot formed in said first holder;

a rack member slidably received in said guide slot, said rack member being operatively meshed with said pinion and having a front end and a rear end; and a cable assembly including a control cable having a front end and a rear end, and a sleeve in which said control cable slides, said control cable extending along the length of said rack member from said rear end thereof and having said front end of said control cable fixed to said front end of said rack member, said rear end of said control cable being adapted to extend toward the damper doors, wherein said clamp member extends across a middle portion of said guide slot to clamp a front end of said sleeve.

2. A damper door controller as claimed in claim 1, in which said first holder comprises:

a base plate in which said elongate guide slot and said clamp member are provided; and a finisher plate to which said rotary knob is rotatably connected, said finisher plate extending perpendicularly downward from a front end of said base plate.

3. A damper door controller as claimed in claim 2, in which said guide slot extends obliquely with respect to said finisher plate.

4. A damper door controller as claimed in claim 3, in which said rack member has bevel teeth operatively meshed with teeth of said pinion.

5. A damper door controller as claimed in claim 2, in which said clamp member is integral with said base plate.

6. A damper door controller as claimed in claim 5, in which said clamp member is formed with a clamping groove whose open side is reduced in size, said clamping groove tightly receiving therein the front end of said sleeve to clamp the same.

7. A damper door controller as claimed in claim 1, wherein rotating said rotary knob moves said rack member in said guide slot between a first position, where said front end of said control cable projects from said front end of said sleeve, and a second position, where said front end of said control cable contacts said front end of said sleeve.

8. A damper door controller as claimed in claim 2, in which said pinion is positioned below said base plate.

9. A damper door controller as claimed in claim 8, in which a rear end of said pinion is rotatably supported by a bracket which extends downward from said base plate.

10. A damper door controller as claimed in claim 1, in which the front end of said control cable is fixed to a projection formed on the front end of said rack member.

11. A damper door controller as claimed in claim 2, further comprising a second holder secured to said base plate to hold said sleeve.

12. A cable type movement transmitting mechanism, comprising:

a first holder having a clamp member;

at least one rotary knob rotatably connected to said first holder;

a pinion coaxially connected to said rotary knob to rotate therewith;

an elongate guide slot formed in said first holder;

a rack member slidably received in said guide slot, said rack member being operatively meshed with said pinion and having a front end and a rear end; and a cable assembly including a control cable having a front end and a rear end, and a sleeve in which said control cable slides, said control cable extending along the length of said rack member from said rear end thereof and having said front end of said control cable fixed to said front end of said rack member, said rear end of said control cable being adapted to extend toward the damper doors, wherein said clamp member extends across a middle portion of said guide slot to clamp a front end of said sleeve.

13. A damper door controller for controlling damper doors of a cooler/heater unit of an automotive air conditioner, comprising:

a first holder having a clamp member;

at least one rotary knob rotatably connected to said first holder;

a pinion coaxially connected to said rotary knob to rotate therewith;

an elongate guide slot formed in said first holder;

a rack member slidably received in said guide slot, said rack member being operatively meshed with said pinion and having a front end and a rear end; and a cable assembly including a control cable having a front end and a rear end, and a sleeve in which said control cable slides, said control cable extending along the length of said rack member from said rear end thereof and having said front end of said control cable fixed to said front end of said rack member, said rear end of said control cable being adapted to extend toward the damper doors, wherein said clamp member extends across a middle portion of said guide slot to clamp a front end of said sleeve, said clamp member formed with a clamping groove whose open side is reduced in size, said clamping groove tightly receiving therein said front end of said sleeve to clamp the same.

14. The damper door controller of claim 13, wherein said first holder comprises:

a base plate in which said elongate guide slot and said clamp member are provided; and a finisher plate rotatably connected to said rotary knob, said finisher plate extending perpendicularly downward from a front end of said base plate.

15. The damper door controller of claim 14, in which said guide slot extends obliquely with respect to said finisher plate.

16. The damper door controller of claim 15, wherein said rack member has bevel teeth operatively meshed with teeth of said pinion.

17. The damper door controller of claim 14, in which said clamp member is integral with said base plate.

18. The damper door controller of claim 13, wherein rotating said rotary knob moves said rack member in said guide slot between a first position, where said front end of said control cable projects from said front end of said sleeve, and a second position, where said front end of said control cable contacts said front end of said sleeve.

19. The damper door controller of claim 14, in which said pinion is positioned below said base plate.

20. The damper door controller of claim 19, wherein a rear end of said pinion is rotatably supported by a bracket which extends downward from said base plate.

21. The damper door controller of claim 13, in which said front end of said control cable is fixed to a position formed on said front end of said rack member.

22. The damper door controller of claim 14, further comprising a second holder secured to said base plate to hold said sleeve.

23. A damper door controller for controlling damper doors of a cooler/heater unit of an automotive air conditioner, comprising:

a first holder having a base plate and a finisher plate rotatably connected to a rotary knob, said base plate having an elongate guide slot formed therein and a clamp member, said finisher plate extending perpendicularly downward from a front end of said base plate;

a pinion coaxially connected to said rotary knob to rotate therewith;

a rack member slidably received in said guide slot, said rack member being operatively meshed with said pinion and having a front end and a rear end; and a cable assembly including a control cable having a front end and a rear end, and a sleeve in which said control cable slides, said control cable extending along the length of said rack member from said rear end thereof and having said front end of said control cable fixed to said front end of said rack member, said rear end of said control cable adapted to extend toward the damper doors, wherein said clamp extends across a middle portion of said guide slot to clamp a front end of said sleeve, and wherein a rear end of said pinion is rotatably supported by a bracket extending downward from said base plate.

* * * * *